UNITED STATES PATENT OFFICE.

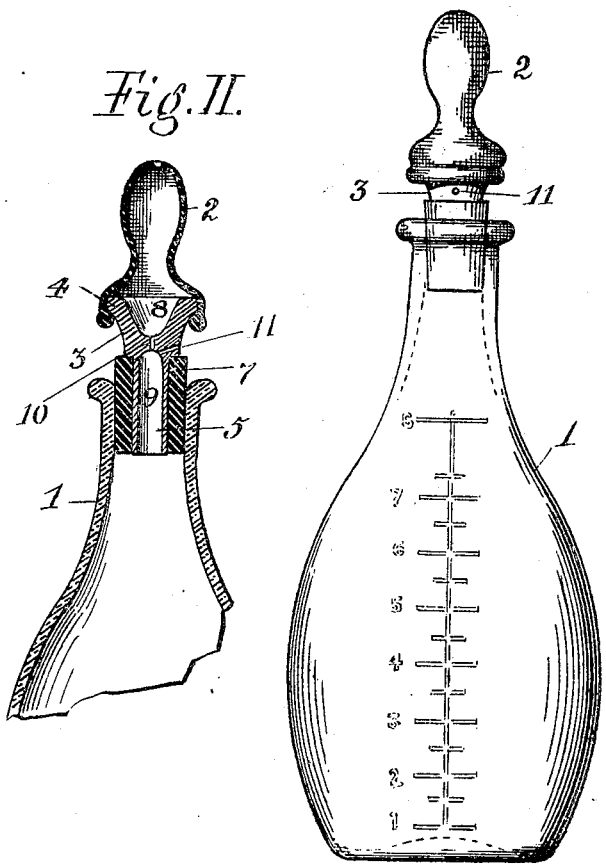

ERNEST H. SIMONDS, OF BERKELEY, CALIFORNIA.

NURSING-BOTTLE.

No. 799,806.        Specification of Letters Patent.        Patented Sept. 19, 1905.

Application filed November 23, 1904. Serial No. 233,963.

*To all whom it may concern:*

Be it known that I, ERNEST H. SIMONDS, a citizen of the United States of America, residing at Berkeley, county of Alameda, and State of California, have invented certain new and useful Improvements in Nursing-Bottles; and I hereby declare the following to be a full, clear, and exact description of the same, reference being had to the accompanying drawings, forming a part of this specification.

This invention relates to nursing-bottles for infants and to certain useful improvements therein, as hereinafter described, and illustrated by the drawings that form a part of this specification.

The objects of my invention are to limit the quantity of milk that will be drawn from a vessel in a given time to the amount required for a child, to prevent distortion or wear of the aperture that gages the flow of the milk, to render such devices antiseptic, and permit their convenient and thorough cleansing. To these ends I provide devices as illustrated in the drawings now to be referred to.

Figure I is a side view of a nursing-bottle provided with my improvements. Fig. II is a partial section through the device shown in Fig. I, and Fig. III shows an adaptation of a part of my invention to a common nursing-bottle.

In feeding infants it is important that the flow of milk will not be much affected by the position of the containing-bottle and will not in any case cause choking by overflow, and that the means of gaging the amount shall remain constant. Such result is not attainable by throats or perforations made in the soft material of which nipples are made, these soon stretching or wearing away. To obviate these impediments and secure the desired ends, I provide an interposed metallic throat-piece in the manner now to be described.

Referring to the drawings, 1 is a common nursing-bottle to contain food-milk for infants.

2 is an elastic mouthpiece to be held in a child's mouth, made of india-rubber or other soft elastic material in the usual manner.

3 is a core-piece, preferably made of silver, aluminium, or other non-corrosive metal, provided with a rounded flange 4, over which is drawn the elastic mouth-nipple 2, as shown in Fig. II. This member 3 has a hollow extension or stem 5, that projects into the bottle 1 and is surrounded by a removable shell 7, made of cork, india-rubber, or other elastic material, that fits into and closes the neck of the bottle 1, forming a cork for the same. The member 3 is formed, as shown in Fig. II, with chambers 8 and 9, and between these is a diaphragm or narrowed portion through which is made a small aperture 10, approximately a thirty-second part of an inch in diameter, or the size of common clothing-pin. The size of this aperture 10 is varied according to the age and size of infants to be fed and is made to pass milk as fast as it should be supplied and swallowed. To prevent obstruction to flow caused by the removal of milk from the bottle and a partial vacuum caused thereby, also to prevent collapse of the elastic nipple 2 and permit uninterrupted feeding of a child, I provide a small aperture 10 through the side of the part 3, through which air can enter, but not large enough to permit leakage of milk in any considerable quantity if this aperture is on the bottom and submerged.

In common usage and with ordinary nipples air is supplied to replace the milk by release of the nipple 2 when the supply has ceased by reason of vacuum formed in the vessel. This permits the entry of air when the nipple is released, which air is swallowed when feeding is resumed.

The member 3 can be applied in the case of an ordinary nursing-bottle when made as shown in Fig. III, in which case the flexible nipple 2 is placed directly upon the bottle.

Like numerals of reference are employed to designate corresponding parts in the several figures.

Having thus described the nature and objects of my invention and the manner of its operating in practice, what I claim as new, and desire to secure by Letters Patent, is—

A nipple for nursing-bottles, comprising a hard central core provided with a hollow member for insertion into the neck of the bottle, said core having a flared outer extremity adapted to receive an ordinary elastic nursing mouthpiece, and a diaphragm between said flared extremity and said hollow member, pierced with a restricted aperture for limiting the flow of milk therethrough, said hollow member being surrounded by an elastic shell to fit the mouth of the bottle, substantially as specified.

In testimony whereof I have signed my name to this specification in the presence of two subscribing witnesses.

ERNEST H. SIMONDS.

Witnesses:
ELMER WICKES,
JAMES L. KING.